Oct. 11, 1949.  E. J. ISBISTER  2,484,034
INTERVAL MEASURING SYSTEM
Filed April 24, 1945  3 Sheets-Sheet 1

INVENTOR
ERIC J. ISBISTER
BY Paul B. Hunter
ATTORNEY

Oct. 11, 1949.    E. J. ISBISTER    2,484,034
INTERVAL MEASURING SYSTEM
Filed April 24, 1945    3 Sheets-Sheet 3

Fig. 4.

INVENTOR
ERIC J. ISBISTER
BY
Paul B. Hunter
ATTORNEY

Patented Oct. 11, 1949

2,484,034

UNITED STATES PATENT OFFICE 2,484,034

INTERVAL MEASURING SYSTEM

Eric J. Isbister, Garden City, N. Y., assignor to The Sperry Corporation, a corporation of Delaware Application April 24, 1945, Serial No. 590,088

11 Claims. (Cl. 178—44)

The present invention relates generally to interval measuring systems, and more particularly to systems for accurately measuring the time interval between similar points on two output pulses and employs revolution counting apparatus responsive to two independent driving members. It is ofttimes desirable to measure the time interval between successive voltage or current wave pulses with great accuracy. This is true, for example, in Loran navigation apparatus, and, therefore, it is an object of the present invention to provide a novel interval measuring system having output circuits producing pulses, the time interval between the pulse of one circuit and that of another circuit being determined with extreme accuracy through the use of suitable phase-shifting apparatus, said time interval being indicated by means of a revolution counter.

Revolution counters have long been known consisting of a train of intermittent gears actuated by a single driving member and having several numbering elements, such as drums, each provided with a series of numerals. The numbering elements are coupled together in a certain transmission ratio to select for exhibition one numeral from those on each drum, and the selected numerals constitute a figure which is proportional to the number of revolutions performed by the driving member. The figure thus assembled may be easily read without any skill or interpolation.

These counters have been incorporated in apparatus for indicating the position of a driven member actuated gradually by a driving member, for example, through speed reduction gearing. The counter is made responsive to the driving member rather than to the driven member in order to improve the accuracy of the positional indication by a factor equal to the speed ratio of the driving and driven members. It is often desirable, however, to position abruptly or slew the driven member independently of the driving member while still permitting the counter to register correctly the resultant position of the driven member.

The need for coarse and fine control over the driven member in order to position the same rapidly and yet accurately is particularly acute in certain known electronic timing apparatus of the general type employing a low frequency phase shifter and a high frequency phase shifter geared together in accordance with the frequencies of the waves transmitted thereby. The waves are synchronized with a periodic reference signal, and the phase shifted low frequency waves are utilized for selecting recurrent portions of the phase shifted high frequency waves to obtain a periodic signal delayed a precise and unambiguous interval with respect to the reference signal.

Apparatus of this character is employed in radio navigation systems where it is essential to change the reading of the device from one precise time delay between the output pulses of the system to an other time delay between the output pulses of the system that may be greatly separated from the first indication but requires equally precise adjustment. If no slewing mechanism is available, several invaluable minutes may be lost in making this re-adjustment solely through a fine control. Another object of the invention is to provide interval measuring systems or timing apparatus employing a plurality of phase shifters connected together in accordance with different frequencies of waves transmitted thereby, the waves being synchronized with a periodic reference signal, the phase-shifted waves of one frequency being utilized for selecting recurrent portions of the phase-shifted waves of another frequency to obtain a periodic signal delayed a precise and unambiguous interval with respect to the reference signal.

Another object of the present invention to provide means for abruptly positioning or slewing a driven member independently of a normal driving member while permitting a counter mechanism to maintain synchronism with the driven member and to register a figure representative of its resultant position.

Generally speaking, the invention contemplates providing connective means for actuating a driven member, such as the shaft of a phase shifter, by two independent driving members, which are referred to throughout the specification as a fine or precise control and a coarse or slewing control. The connective means takes the form of a clutching mechanism or differential gear unit. A counter of the type described above is made responsive to the fine control for composing a figure representative of the position of the driven member. Another connective means is included in the coupling between two adjacent numbering elements of the counter, for example, between the hundreds and thousands drums. This latter connective means not only permits the numbering element representing the lower decimal place to drive intermittently the element representing the next higher decimal place but also allows the coarse control to change the numeral selected for exhibition by the greater-valued numbering element, e. g. the thousands drum, in accordance with an equivalent change effected by the coarse control in the position of the driven member.

The invention will be more fully understood by reference to the specific embodiments illustrated in the drawings and the following description thereof.

In the drawings.

Similar reference numerals are employed to indicate corresponding parts in the above figures.

Figures 1, 2:
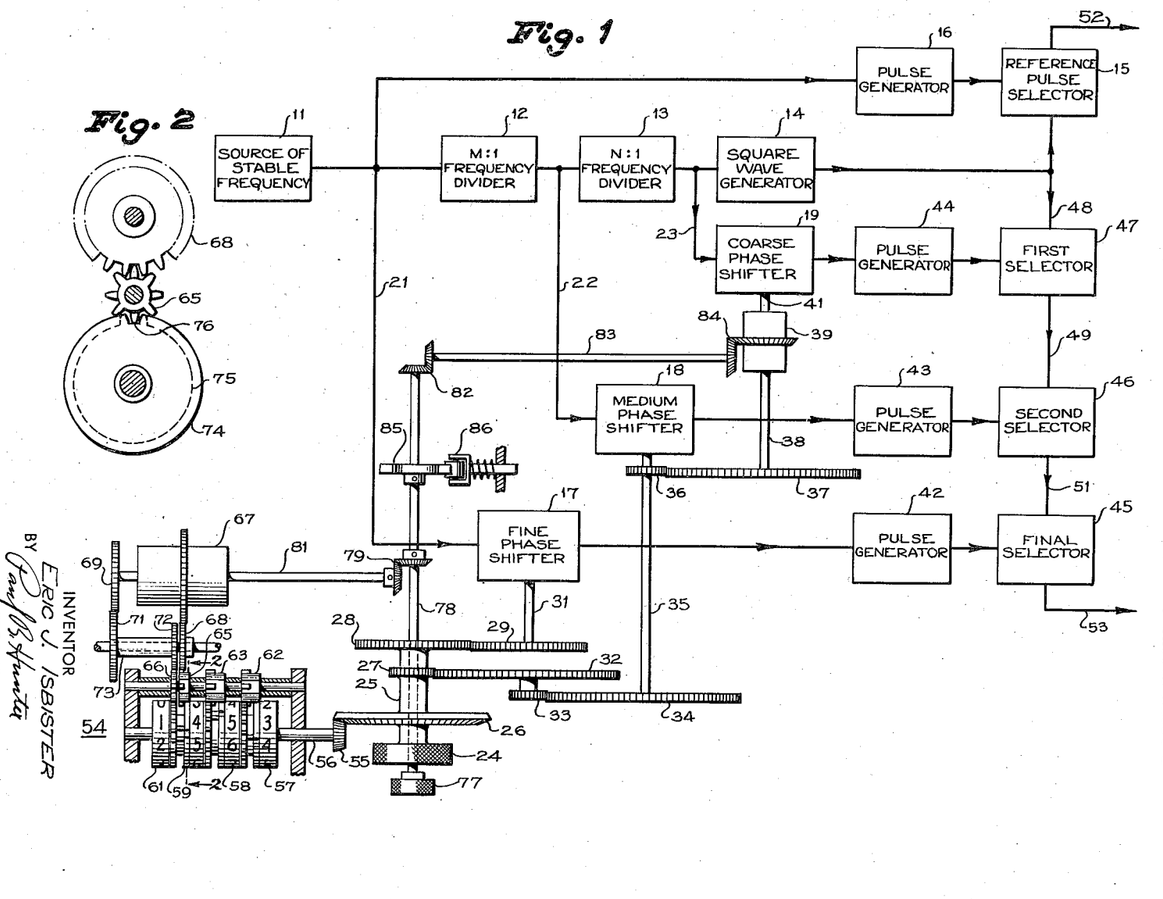
Fig. 1 is a schematic block diagram of timing apparatus employing a counter type of time delay indicator and arranged in accordance with the invention to permit slewing or abrupt changes in the timed interval.
Fig. 2 is a cross-sectional view taken along broken line 2—2 of a detail of the counter shown in Fig. 1.

Referring now to Fig. 1, the invention is illustrated in combination with known timing apparatus wherein a source 11 of stable frequency provides sinusoidal waves which are utilized as the basis for precise interval measurements in the manner now to be described. The waves from source 11 are supplied to a frequency divider 12 which is adapted to reduce the frequency of the applied waves by a factor M and to provide sinusoidal signals at a subharmonic of the frequency generated by source 11 to a further frequency divider 13. Divider 13 is generally similar to device 12, and is designed to lower the frequency of the incoming waves by a factor N. The output waves from divider 13 are supplied to a square wave generator 14 whose function consists of forming substantially rectangular waves accurately synchronized at one half the frequency of the applied signals.

The output of generator 14 is connected to a reference pulse selector 15. The selector 15 comprises a trigger circuit such as a multivibrator which is adapted to alter its quiescent condition or be "turned on" by the leading edge of the low frequency wave from generator 14. The selector 15 is returned to its initial quiescent condition or "turned off" by the next cycle of the waves issuing from source 11 subsequent to the wave from generator 14. This is accomplished by the provision of a pulse generator 16 which has its input supplied from source 11 and its output applied to the reference pulse selector 15. A pedestal wave whose commencement and conclusion are determined by circuits 14 and 16, respectively, appears on output lead 52 of selector 15. The recurrence rate of this pedestal wave is low and yet its rear edge is precisely defined; consequently, it is well adapted to serve as a low frequency time reference signal.

The pulse generator 16 may comprise distorting amplifiers which clip the tops of the waves from source 11 and form square waves which may then be differentiated to produce pulses suitable for triggering selector 15. Pulse generator 16, on the other hand, may comprise the well-known saturable transformer type of pulse forming circuit.

A pulse whose trailing edge is delayed a precise interval with respect to the termination of the time reference signal on lead 52 is obtained in the following manner: Fine, medium, and coarse continuously adjustable linear phase shifters 17, 18 and 19, respectively, are supplied with sinusoidal waves of harmonically related frequencies over leads 21, 22 and 23, respectively, from source 11, divider 12 and divider 13, respectively. These phase shifters are geared together in accordance with the frequencies of the waves transmitted thereby. A fine control knob 24 is attached to a hollow shaft 25 on which are fixed gears 26, 27 and 28. Gear 28 meshes with a gear 29 mounted on a shaft 31 adapted to actuate phase shifter 17. Gear 27 is coupled through speed reduction gearing 32, 33 and 34 to drive a shaft 35 associated with medium phase shifter 18. A gear 36 is fixed to shaft 35 and meshes with gear 37 connected to a shaft 38. Shaft 38 forms one input to a differential gear unit 39 whose output shaft 41 serves to control the coarse phase shifter 19.

It is seen that phase shifters 17, 18 and 19 are interconnected by gearing in such manner that rotation of the knob 24 produces progressively reduced rotation of the fine, medium and coarse phase shifters with the result that the harmonically related series of waves supplied over leads 21, 22 and 23 are subjected to substantially the same time delay, although the phase shift of the highest frequency waves is generally many times 360°, while the shift of the lowest frequency waves is a fraction of a period.

The phase shifted outputs of devices 17, 18 and 19 are applied to similar pulse generators 42, 43 and 44, respectively, corresponding to pulse generator 16. Pulse generators 42, 43 and 44 supply triggering signals to final, second, and first selectors 45, 46 and 47, respectively. These selector circuits may be generally similar to reference pulse selector 15. First selector 47 is adapted to be turned on by the trailing edge of the square wave supplied by generator 14 over a lead 48 and turned off by the next signal from pulse generator 44. The pulse or pedestal wave formed by the operation of the first selector 47 is fed by a lead 49 to the second selector 46 where its trailing edge triggers on this latter circuit. The first ensuing pulse from generator 43 returns selector 46 to its normal quiescent condition, and determines the ending of the pedestal wave formed by the second selector. This pedestal wave is supplied through a lead 51 to the final selector 45 where its cessation initiates another pedestal terminated by the next succeeding pulse issuing from generator 42.

The end of the pedestal generated by final selector 45 and appearing on output lead 53 is thus delayed a precise and unambiguous time interval with respect to the corresponding portion of the pedestal created by reference pulse selector 15 and appearing on output lead 52. This interval is proportional to the total number of degrees through which shaft 31 of the fine phase shifter 17 has been rotated. The function of the coarse and medium phase shifters is to eliminate any ambiguity in the measurement of the time delay by keeping track of the integral number of revolutions through which shaft 31 has been rotated. The accuracy with which the time delay may be determined is substantially independent of the accuracies of the medium and coarse phase shifters. The pulses produced by generator 44 must, however, occur in an interval preceding the trigger pulse from generator 43 not greater than the period of the medium frequency waves, and the trigger pulse from generator 43 in like manner must immediately precede the pulse that it is desired to select from generator 42 by an interval not greater than the period of the waves from source 11.

One use of this invention is to measure the time between two related radio signals. For instance, the time of transmission and reception of a radar signal, which signals would be ordinarily placed upon the deflection plates of a cathode ray tube and the apparatus of the present invention would be adapted for controlling the sweep circuits of the cathode ray tube. The sweep circuits supplied to the cathode ray tube are fed from the output leads 52 and 53, since the outputs of these leads have a very accurate time difference.

The time interval selected by the above apparatus is conveniently indicated by a revolution counter 54 driven in synchronism with the phase shifters by means of bevel gear 55 attached to counter input shaft 56 and meshed with gear 26. The counter 54 is generally of conventional design having a units, tens, hundreds, and thousands drum 57, 58, 59, and 61, respectively, connected together through intermittent gearing so that a complete turn of one drum or counter wheel will cause a small angular displacement of the adjacent drum on the left. The interconnection between the units and tens counter wheels 57 and 58 and between the tens and hundreds counter wheels 58 and 59 includes star wheels 62 and 63, respectively. Star wheels 62 and 63 operate in a conventional manner to couple mutilated gears attached to counter wheels on the right with full-toothed gears fixed to counter wheels on the left.

The star wheel between the hundreds and thousands drum, however, is not conventional but is separated into two independent portions 65 and 66. The left-hand portion 66 is a pinion meshed with the gear attached to drum 61, while the right-hand portion 65 is a star wheel generally similar to wheels 62 and 63 but narrower by approximately the width of pinion 66. Star wheel 65 and pinion 66 are connected through the agency of a differential 67. Idler gear 68 couples wheel 65 with one input of differential 67 whose output gear 69 is adapted to drive pinion 66 through idler gears 71 and 72 mounted for joint rotation on a sleeve 73.

Fig. 2 illustrates a cross section of the intermittent gearing included in the coupling between counter wheels 59 and 61. The star wheel 65 has its alternate teeth extending entirely across and half way across its width so that the left-hand portion of the wheel has a full number of teeth and the right-hand portion half the full number of teeth. The right-hand half of wheel 65 engages a mutilated gear 74 and the left-hand half engages a mutilated gear 75. The mutilated gear 74 comprises a cylindrical surface which is provided with a recess or notch 76 whose sides coincide with two teeth of the mutilated gear 75, the remainder of the latter gear being cut away to its root circle. Two of the teeth on the right-hand portion of the star wheel 65 normally rest upon the surface of the mutilated gear 74, and prevent the wheel 65 from being turned inadvertently. The relation between the recess 76 and the two teeth of the mutilated gear 75 is such that when counter wheel 59 makes a complete revolution, one of the teeth resting against gear 74 will be allowed to extend into the notch 76 and permit an angular advance of the star wheel 65. The speed ratio between counter wheels 59 and 61 is such as to effect a tenth of a revolution in the latter for one complete revolution of the former.

The apparatus described in the foregoing with the exception of the differential gear units 39 and 67 and the split star wheel 65, 66 does not of itself form part of the invention, for, although not as yet well-known, apparatus of this general character has been developed prior to the slewing apparatus evolved by the present inventor.

It has been found necessary in practical applications of this timing apparatus to change from one time delay to a greatly different value in a matter of seconds. It is evident that this would be impossible by manipulating only the fine control knob 24. A coarse control knob 77 is therefore provided fixed to a shaft 78 positioned for convenience concentrically with hollow shaft 25 and extending therethrough to facilitate transfer of manipulation from fine knob 24 to coarse knob 77 and vice versa. Shaft 78 is connected through bevel gears 79 to a second input shaft 81 of the differential gear unit 67, and is also coupled through bevel gears 82, shaft 83 and bevel gears 84 to a second input of the differential gear unit 39.

The coupling of the slewing knob 77 to the differential gear units 39 and 67 permits the introduction of large changes in the time delayed signal by actuating the coarse phase shifter 19 independently of the other phase shifters and concurrently registering the large time delay change on the counter wheel 61 independently of the time delay indicated in accordance with the position of the fine control knob 24. A detent cam 85 fixed to slewing shaft 78 cooperates with a spring loaded roller 86 to insure that the delay introduced is equal to an integral multiple of the maximum unambiguous delay obtainable from the medium phase shifter 18. The detent 85 also predetermines the alignment of the numeral selected by drum 61 corresponding to the inserted time delay.

In the mechanical operation of the structure shown in Fig. 1, rotation of the fine knob 24 actuates the counter 54 in synchronism with the phase shifters 17, 18 and 19. The drum 59, in the act of completing one revolution, drives the drum 61 through the differential 67 whose shaft 81 is locked by the detent 85. Since input shaft 83 of differential 39 is also locked by the same detent, shafts 38 and 41 controlling the coarse phase shifter 19 are in effect connected together. It is to be noted that each time any counting wheel or wheels are rotated they move at the speed of the units wheel 57 even though the differential 67 may be included in the coupling between wheels.

When the coarse control knob 77 is rotated, the detent 85 is overpowered, and shafts 81 and 83 are abruptly actuated in unison any desired number of steps or jumps. Input shaft 38 of differential 39 is effectively locked by the large speed multiplication afforded by the gearing between it and the fine control knob 24, while the star wheel 65 locks the alternate input to the differential gear unit 67. Thus, counter wheel 61 and the coarse phase shifter 19 are rotated in synchronism and the detent 85 insures that their resting position is predetermined.

For a specific example and for illustrative purposes only, the frequency of source 11 may be 20 kc. and the dividing factors M and N associated with the frequency dividers 12 and 13, respectively, may be 20 and 5, respectively, with the result that the frequency of the waves passing through medium phase shifter 18 and coarse phase shifter 19 will be 1000 cycles and 200 cycles, respectively. The speed ratio between fine control knob 24 and shafts 31, 35 and 41 to agree with these conditions will be 1:1, 20:1 and 100:1, respectively. The detent 85 will necessarily provide five equiangularly spaced steps in order that the change of delay introduced by the slewing control 77 be equal to some integral multiple period of the waves transmitted by the medium phase shifter 18. This assures that the slewing operation takes place in exact 1000 microsecond steps so that electrical synchronism of the system is maintained. The total delay time which may be unambiguously measured is 5000 microseconds, since this is the period of the 200 cycle waves assumed to be transmitted by the coarse phase shifter 19.

The thousands drum 61 will, therefore, be marked from 0 to 4 over one-half the circumference and repeated over the other half of the drum, while the other drums will be marked from 0 to 9 evenly spaced around their peripheries. Since a complete revolution of the phase shifter 17 when transmitting 20 kc. corresponds to 50 microseconds, the gears 26 and 55 will be so proportioned that ⅕ of a revolution of shaft 31 or, what amounts to the same thing under the specified relationships, ⅕ of a revolution of knob 24 effects a full revolution of the units drum 57. Thus, it is seen that indicator 54 will indicate directly in decimal parts of a second.

The slewing mechanism disclosed in Fig. 1 makes possible two measurements separated by the maximum delay after rotating the coarse control knob 77 no more than ⅗ of a turn and the fine control knob 24 no more than 10 revolutions. It is evident that the ability to roughly set the delay greatly facilitates the employment of the system.

Figure 3:
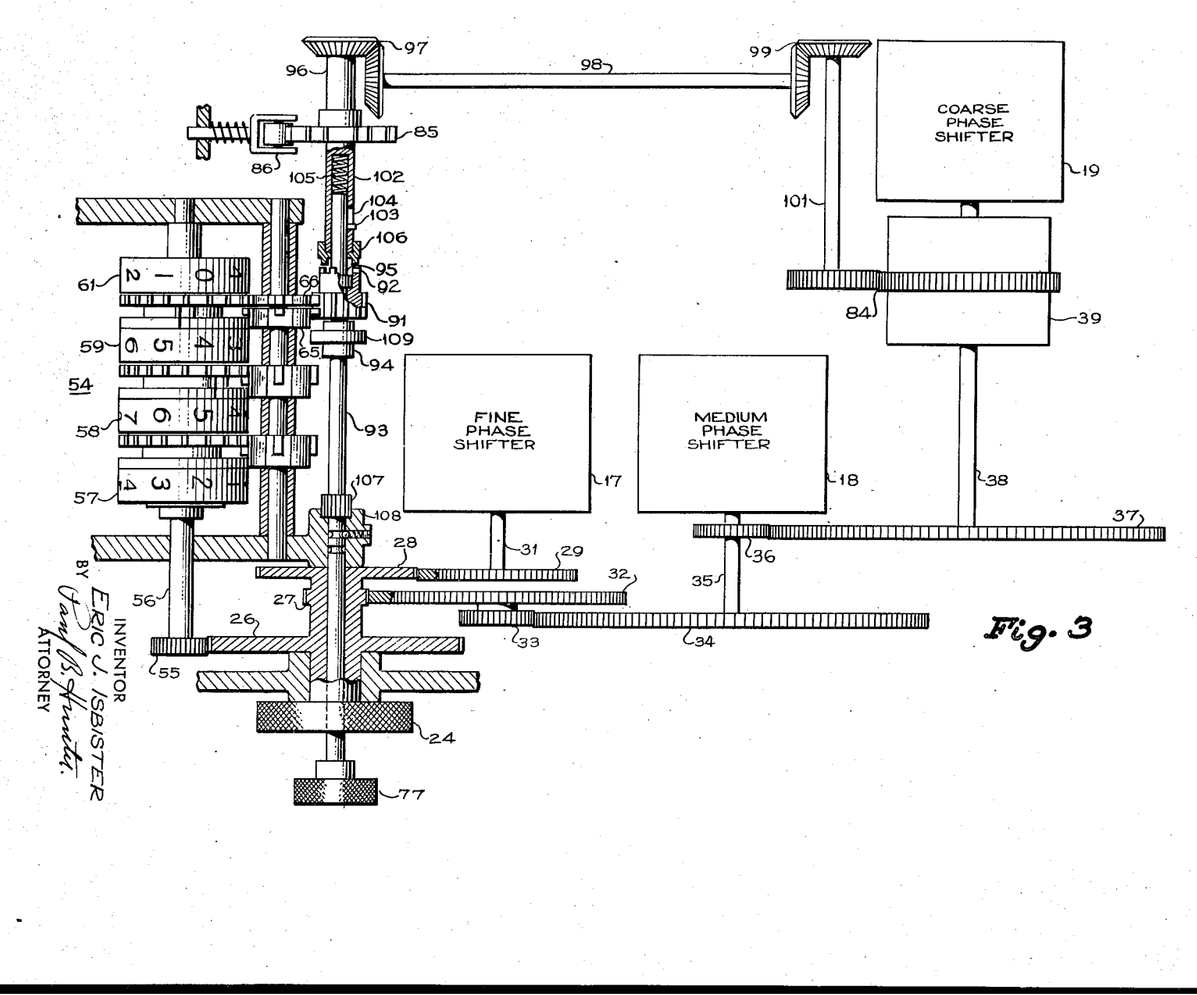
Fig. 3 is a schematic block diagram of an alternative form of slewing mechanism.

Referring now to Fig. 3, there is illustrated a positive clutch mechanism which may be employed in place of the differential gear unit 67 shown in Fig. 1 associated with the counter 54. An idler gear 91 having a jaw clutch 92 formed integral therewith is freely rotatable on a shaft 93 but restrained from axial movement therealong by collars 94 and 95 pinned to the shaft 93. Gear 91 normally meshes with star wheel 65 and pinion 66 associated with counter wheels 59 and 61, respectively, discussed with reference to Fig. 1.

In ordinary operation, the counter 54 may be actuated by the fine control knob 24 in synchronism with the phase shifters 17, 18 and 19 and the hundreds drum 59 is free to drive the thousands drum 61 through the agencies of gears 65, 91 and 66. A shaft 96 connected to the differential 39 through bevel gears 97, shaft 98, bevel gears 99, shaft 101, and gears 84 is aligned with shaft 93 and is formed with a sleeve portion 102 adapted to receive an end of shaft 93. A pin 103 fixed to shaft 93 cooperates with a groove 104 to permit sliding movement of shaft 93 with respect to shaft 96, while coupling their rotational motions. A compressional spring 105 placed within the sleeve 102 tends to force shafts 93 and 96 apart. The sleeve 102 is terminated by a jaw clutch 106 adapted to engage clutch 92 when the shaft 93 is forced towards the shaft 96 by pushing in coarse control knob 77 mounted on shaft 93. A splined portion 107 cooperates with a splined bushing 108 to prevent rotation of shaft 93 except when clutch portions 92 and 106 are fully engaged and when gear 91 is slid out of engagement with star wheel 65. The detent cam 85 is fastened to the shaft 96 and permits it to rest only at equiangularly displaced positions. The numbers of the clutch gearing teeth, the splines and the detent steps are related by a common multiple, for example, 5.

The normal operation of the structure of Fig. 3 is substantially the same as that of Fig. 1. If, however, it is desired to alter the time delay in thousand microsecond steps, coarse control knob 77 is pushed in against the pressure of spring 105 sliding gear 91 out of mesh with star wheel 65. When the clutch portions 92 and 106 are fully engaged and gear 91 couples only pinion 66, spline 107 is freed from locking engagement with bushing 108. Knob 77 may now be rotated the desired number of detent steps. The thousands wheel 61 and the coarse phase shifter 19 are forced to turn in unison. A shoulder 109 on collar 94 locks the star wheel 65 and prevents any manipulation of the fine control knob 24 from disturbing the relationship between the counter indication and the angular position of the coarse phase shifter 19. The detent 85 not only insures that the electrical portion of the system is always maintained in synchronism, but also predetermines the meshing of gear 91 with star wheel 65 and spline 107 with bushing 108 when upon releasing knob 77, spring 105 returns the gear 91 to its normal free running position coupling the hundreds drum 59 to the thousands drum 61. It is to be observed that the detent 85 need not be strong since shaft 93 is locked by means of the spline 107 when the fine control knob 24 is in use.

The structure of Fig. 3 is preferable to that of Fig. 1 under certain conditions, since only one gear, gear 91, loads the counter and therefore more liberal mechanical tolerances are permissible without the risk that backlash will confuse the reading of the thousands drum 61.

Figure 4:
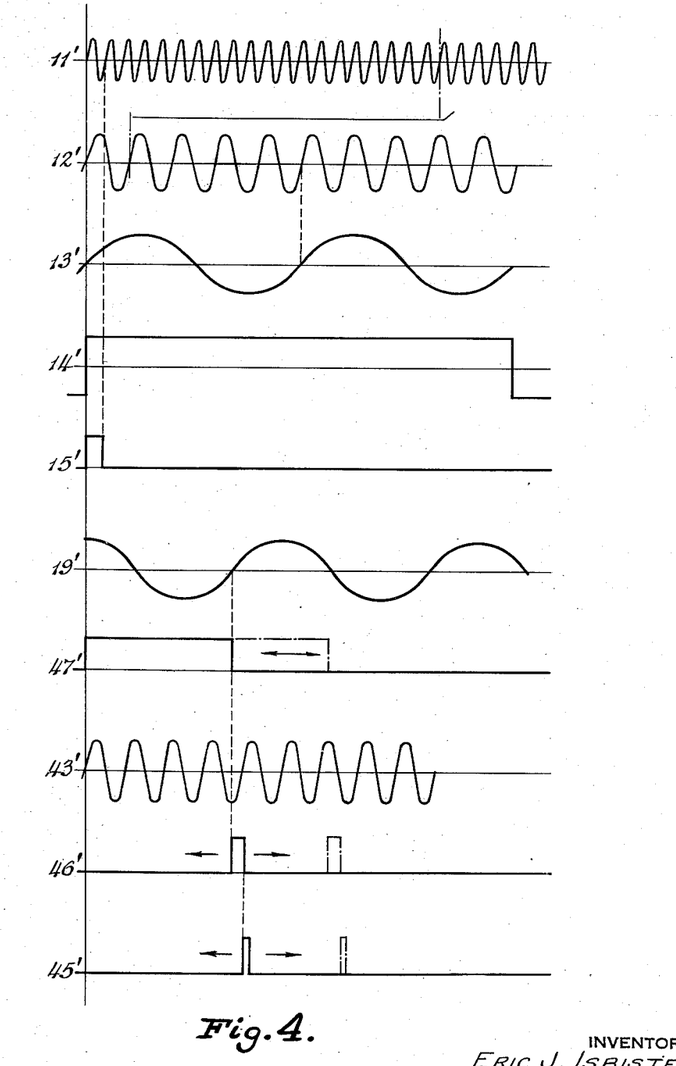
Fig. 4 is a diagrammatic view illustrating the wave relationships of component parts of the system.

Fig. 4 is a diagrammatic view showing the wave relationships of the outputs of the various components of the system, each component referred to in this case being designated by the numeral omitting the prime occurring in Fig. 4. For example, the wave form designated 11' in Fig. 4 indicates the frequency output of source 11. Following out the example previously given herein, twenty cycles of this frequency corresponds in time to one cycle of the output of the frequency divider 12, whose output is designated 12' in the drawing of Fig. 4. On the other hand, the output of the frequency divider 13 is a wave whose cycle corresponds to five cycles of that of the output of frequency divider 12. 14' designates the square wave output of square wave generator 14, and 15' designates the pulse output of the output lead circuit 52. The coarse phase shifter 19 has an output frequency the same as that of 13', but this frequency is shifted in phase in accordance with the adjustment of the knob 24. The output of selector 47, designated 47' in Fig. 4, is accordingly shifted as to duration of the square wave, as indicated by the arrow in Fig. 4; i. e., if the wave output of coarse phase shifter 19 shifts, the duration of the square wave of the selector 47 will correspondingly vary. Similarly, the output of the pulse generator 43, fed from the medium phase shifter 18, is designated 43' in the drawing and this output voltage, which corresponds to a frequency of 1000 cycles, is shifted in phase with adjustment of the medium phase shifter 18, and this shift in phase automatically causes the output of the second selector 46, designated 46' in Fig. 4, to shift back and forth, as indicated by the arrows, as a whole, so that the output of final selector 45 similarly shifts. Thus, through use of the several phase shifters and manner of tying these phase shifters together to avoid ambiguity, an extremely accurate timing of the interval between the output pulse 45' and that of 15' is obtained.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In electronic timing apparatus employing a low frequency phase shifter and a high frequency phase shifter geared together in accordance with the frequencies of the waves transmitted thereby, the waves being synchronized with a periodic reference signal, and the phase shifted low frequency waves being utilized for selecting recurrent portions of the phase shifted high frequency waves to obtain a periodic signal delayed a precise and unambiguous interval with respect to said reference signal, the combination comprising a revolution counter responsive to said high frequency phase shifter for indicating the time delay, means for introducing a large change in said time delay by actuating said low frequency phase shifter independently of said high frequency phase shifter, and means for registering said large time delay change on said counter independently of the time delay indicated in response to said high frequency phase shifter.

2. In electronc timing apparatus employing a low frequency phase shifter and a high frequency phase shifter geared together in accordance with the frequencies of the waves transmitted thereby, the waves being synchronized with a periodic reference signal, and the phase shifted low frequency waves being utilized for selecting recurrent portions of the phase shifted high frequency waves to obtain a periodic signal delayed a precise and unambiguous interval with respect to said reference signal, the combination comprising a revolution counter responsive to said high frequency phase shifter for indicating the time delay, a first differential mechanism for introducing a large change in said time delay by actuating said low frequency phase shifter independently of said high frequency phase shifter, and a second differential mechanism for registering said large time delay change on said counter independently of the time delay indicated in response to said high frequency phase shifter.

3. In electronic timing apparatus employing a low frequency phase shifter and a high frequency phase shifter geared together in accordance with the frequencies of the waves transmitted thereby, the waves being synchronized with a periodic reference signal, and the phase shifted low frequency waves being utilized for selecting recurrent portions of the phase shifted high frequency waves to obtain a periodic signal delay a precise and unambiguous interval with respect to said reference signal, the combination comprising a revolution counter responsive to said high frequency phase shifter for indicating the time delay, a differential mechanism for introducing a large change in said time delay by actuating said low frequency phase shifter independently of said high frequency phase shifter, and a positive clutch mechanism for registering said large time delay change on said counter independently of the time delay indicated in response to said high frequency phase shifter.

4. In electronic timing apparatus employing a low frequency phase shifter and a high frequency phase shifter geared together in accordance with the frequencies of the waves transmitted thereby, the waves being synchronized with a periodic reference signal, and the phase shifted low frequency waves being utilized for selecting recurrent portions of the phase shifted high frequency waves to obtain a periodic signal delayed a precise and unambiguous interval with respect to said reference signal, the combination comprising a counter driven in accordance with the position of said high frequency phase shifter, said counter including a plurality of interconnected numbering elements, each provided with a set of numerals and movable to select for exhibition a single numeral from each set, the selected numerals constituting a figure representing the time delay of said signal, means for introducing a large change in said time delay by actuating said low frequency phase shifter independently of said high frequency phase shifter, and means for registering said large time delay change on said counter independently of the time delay indicated in accordance with the position of said high frequency phase shifter.

5. In electronic timing apparatus providing first and second phase shifters for receiving a first and a second harmonically related series of waves, respectively, said waves being synchronized with a periodic reference signal and said phase shifters being coupled in such manner as to subject said waves to substantially the same time delay with the result that the amount of phase shift suffered by said first waves serves at least in part to determine the number of integral periods by which said second waves are delayed, and wherein said first waves are employed in the selection of a portion of said second waves for obtaining a signal precisely delayed with respect to said reference signal and recurring at a submultiple of the frequency of said second waves, the combination comprising a revolution counter responsive to said second phase shifter for indicating the time delay of said signal, means for actuating said first phase shifter independently of said second phase shifter to change the phase of said first waves by an amount substantially corresponding to a predetermined number of cycles of said second waves, and means for registering a time delay change on said counter corresponding exactly to said predetermined number of cycles independently of the time delay indicated in response to said second phase shifter.

6. In electronic timing apparatus providing first and second phase shifters for receiving a first and a second harmonically related series of waves, respectively, said waves being synchronized with a periodic reference signal and said phase shifters being coupled in such manner as to subject said waves to substantially the same time delay with the result that the amount of phase shift suffered by said first waves serves at least in part to determine the number of integral periods by which said second waves are delayed, and wherein said first waves are employed in the selection of a portion of said second waves for obtaining a signal precisely delayed with respect to said reference signal and with respect to said unshifted waves, said signal recurring at a submultiple of the frequency of said second waves, the combination comprising a revolution counter responsive to said second phase shifter for indicating the time delay of said signal, a first differential mechanism intermediate said phase shifters for actuating said first phase shifter independently of said second phase shifter to change the phase of said first waves by an amount substantially corresponding to a predetermined number of cycles of said second waves, and a second differential mechanism for registering a time delay change on said counter corresponding exactly to said predetermined number of cycles independently of the time delay indicated in response to said second phase shifter.

7. In electronic timing apparatus providing first and second phase shifters for receiving a first and a second harmonically related series of waves, respectively, said waves being synchronized with a periodic reference signal and said phase shifters being coupled in such manner as to subject said waves to substantially the same time delay with the result that the amount of phase shift suffered by said first waves serves at least in part to determine the number of integral periods by which said second waves are delayed, and wherein said first waves are employed in the selection of a portion of said second waves for obtaining a signal precisely delayed with respect to said reference signal and with respect to said unshifted waves, said signal recurring at a submultiple of the frequency of said second waves, the combination comprising a revolution counter responsive to said second phase shifter for indicating the time delay of said signal, a differential mechanism intermediate said phase shifters for actuating said first phase shifter independently of said second phase shifter to change the phase of said first waves by an amount substantially corresponding to a predetermined number of cycles of said second waves, and a positive clutch mechanism for registering a time delay change on said counter corresponding exactly to said predetermined number of cycles independently of the time delay indicated in response to said second phase shifter.

8. In electronic timing apparatus providing first and second phase shifters for receiving a first and a second harmonically related series of waves, respectively, said waves being synchronized with a periodic reference signal and said phase shifters being coupled in such manner as to subject said waves to substantially the same time delay with the result that the amount of phase shift suffered by said first waves serves at least in part to determine the number of integral periods by which said second waves are delayed, and wherein said first waves are employed in the selection of a portion of said second waves for obtaining a signal precisely delayed with respect to said reference signal and with respect to said unshifted waves, said signal recurring at a submultiple of the frequency of said second waves, the combination comprising a first differential gear unit having two input gears and an output gear, said output gear and one of said input gears being included in the coupling between said phase shifters, a revolution counter having a plurality of intermittently coupled scales, one of said scales being actuated in response to said second phase shifter for indicating the time delay of said signal, a second differential gear unit having two input gears and an output gear, said output gear and one of said input gears being included in the coupling between two of said counter scales, a slewing member coupled to both the other of said input gears of said differential gear units for introducing a change in the phase of said first waves substantially corresponding to a predetermined number of cycles of said second waves and registering a time delay change on said counter corresponding exactly to said predetermined number of cycles.

9. In electronic timing apparatus providing first and second phase shifters for receiving a first and a second harmonically related series of waves, respectively, said waves being sychronized with a periodic reference signal and said phase shifters being coupled in such manner as to subject said waves to substantially the same time delay with the result that the amount of phase shift suffered by said first waves serves at least in part to determine the number of integral periods by which said second waves are delayed, and wherein said first waves are employed in the selection of a portion of said second waves for obtaining a signal precisely delayed with respect to said reference signal and with respect to said unshifted waves, said signal recurring at a submultiple of the frequency of said second waves, the combination comprising a differential gear unit having two input gears and an output gear, said output gear and one of said input gears being included in the coupling between said phase shifters, a slewing member coupled to the other of said input gears, a revolution counter having a first scale actuated in response to said second phase shifter and at least a second scale normally locked and intermittently coupled to said first scale, said scales serving to indicate the time delay of said signal, means coordinated with said slewing member for unlocking said second scale and incapacitating the coupling to said first scale, and means positively coupling said first phase shifter and said second scale for changing the indication of said counter in accordance with the change effected by said slewing member in time delay of said signal.

10. In electronic timing apparatus providing first and second phase shifters for receiving a first and a second harmonically related series of waves, respectively, said waves being synchronized with a periodic reference signal and said phase shifters being interconnected in such manner as to subject said waves to substantially the same time delay with the result that the amount of phase shift suffered by said first waves serves at least in part to determine the number of integral periods by which said second waves are delayed, and wherein said first waves are employed in the selection of a portion of said second waves for obtaining a signal precisely delayed with respect to said reference signal and with respect to said unshifted waves, said signal recurring at a submultiple of the frequency of said second waves, the combination comprising connective means having two input couplings for actuating said first phase shifter, one of said couplings being included in the connection between said phase shifters, a slewing member connected to the other of said couplings, a revolution counter having a plurality of intermittently coupled scales, one of said scales being actuated in response to said second phase shifter for indicating the time delay of said signal, and means coordinated with said slewing member included in the coupling between two of said scales for registering a time delay change on said counter corresponding to the change in the phase of said first waves effected by said slewing member.

11. In electronic timing apparatus providing first and second phase shifters for receiving a first and a second harmonically related series of waves, respectively, said waves being synchronized with a periodic reference signal and said phase shifters being interconnected in such a manner as to subject said waves to substantially the same time delay with the result that the amount of phase shift suffered by said first waves serves at least in part to determine the number of integral periods by which said second waves are delayed, and wherein said first waves are employed in the selection of a portion of said second waves for obtaining a signal precisely delayed with respect to said reference signal and with respect to said unshifted waves, said signal recurring at a submultiple of the frequency of said second waves, the combination comprising connective means having two input couplings for actuating said first phase shifter, one of said couplings being included in the connection between said phase shifters, a slewing member connected to the other of said couplings, a revolution counter having a first scale actuated in response to said second phase shifter and at least a second scale normally locked and intermittently coupled to said first scale, said scales serving to indicate the time delay of said signal, means coordinated with said slewing member for unlocking said second scale and incapacitating the coupling to said first scale, and means positively coupling said first phase shifter and said second scale for changing the indication of said counter in accordance with the change effected by said slewing machine in time delay of said signal.

ERIC J. ISBISTER.

REFERENCES CITED

The following references are of record in the file of this patent:

UNITED STATES PATENTS

| Number | Name | Date |
| --- | --- | --- |
| 2,273,956 | Hall | Feb. 24, 1942 |
| 2,277,643 | Holmes | Mar. 24, 1942 |
| 2,387,417 | Sundt | Oct. 23, 1945 |
| 2,401,094 | Nicholson | May 28, 1946 |
| 2,407,294 | Shockley et al. | Sept. 10, 1946 |

Certificate of Correction

October 11, 1949

Patent No. 2,484,034

ERIC J. ISBISTER

It is hereby certified that error appears in the printed specification of the above numbered patent requiring correction as follows:

Column 14, line 6, for the word "machine" read *member*;

and that the said Letters Patent should be read with this correction therein that the same may conform to the record of the case in the Patent Office.

Signed and sealed this 23rd day of May, A. D. 1950.

[SEAL]

THOMAS F. MURPHY,
*Assistant Commissioner of Patents.*